United States Patent
Lee et al.

(10) Patent No.: US 12,341,183 B2
(45) Date of Patent: Jun. 24, 2025

(54) METHOD OF PREPARING CATHODE ACTIVE MATERIAL, CATHODE FOR LITHIUM SECONDARY BATTERY AND LITHIUM SECONDARY BATTERY

(71) Applicant: SK ON CO., LTD., Seoul (KR)

(72) Inventors: Sang Han Lee, Daejeon (KR); Jung Hwan Kim, Daejeon (KR); Jong Hyuk Lee, Daejeon (KR); In Haeng Cho, Daejeon (KR); Dong Wook Ha, Daejeon (KR)

(73) Assignee: SK ON CO., LTD., Seoul (KR)

(*) Notice: Subject to any disclaimer, the term of this patent is extended or adjusted under 35 U.S.C. 154(b) by 0 days.

(21) Appl. No.: 18/362,966

(22) Filed: Aug. 1, 2023

(65) Prior Publication Data

US 2024/0047646 A1 Feb. 8, 2024

(30) Foreign Application Priority Data

Aug. 4, 2022 (KR) .................. 10-2022-0097383

(51) Int. Cl.
*H01M 4/131* (2010.01)
*H01M 4/525* (2010.01)
*H01M 4/62* (2006.01)
*H01M 10/0525* (2010.01)
*C01G 53/50* (2025.01)
*H01M 4/02* (2006.01)

(52) U.S. Cl.
CPC .......... *H01M 4/131* (2013.01); *H01M 4/525* (2013.01); *H01M 4/62* (2013.01); *H01M 10/0525* (2013.01); *C01G 53/50* (2013.01); *H01M 2004/021* (2013.01); *H01M 2004/028* (2013.01)

(58) Field of Classification Search
CPC ................. H01M 4/525; H01M 4/131; H01M 2004/021; H01M 2004/028; C01G 53/50
See application file for complete search history.

(56) References Cited

U.S. PATENT DOCUMENTS

2021/0305558 A1 9/2021 Choi et al.
2021/0384505 A1* 12/2021 Lee ................. H01M 4/131
(Continued)

FOREIGN PATENT DOCUMENTS

| EP | 3499614 A1 | 6/2019 |
| EP | 4280303 A1 | 11/2023 |
| JP | 5555334 B2 | 7/2014 |

(Continued)

OTHER PUBLICATIONS

Shan Yang, Binggong Yan, Jiaxiong Wu, Li Lu, and Kaiyang Zeng; Temperature-Dependent Lithium-Ion Diffusion and Activation Energy of Li1.2Co0.13Ni0.13Mn0.54O2 Thin-Film Cathode at Nanoscale by Using Electrochemical Strain Microscopy; ACS Applied Materials & Interfaces 2017 9 (16), 13999-14005.*

(Continued)

*Primary Examiner* — Laura Weiner
(74) *Attorney, Agent, or Firm* — IP & T GROUP LLP

(57) ABSTRACT

A cathode for a lithium secondary battery includes a cathode current collector, and a cathode active material layer on the cathode current collector. The cathode active material layer includes a plurality of a lithium-metal oxide particle that has a shape of a single particle. An activation energy (Ea) of the cathode is in a range from 50 kJ/mol to 80 kJ/mol.

7 Claims, 2 Drawing Sheets

(56) References Cited

U.S. PATENT DOCUMENTS

2022/0052332 A1 2/2022 Lee et al.
2022/0407064 A1 12/2022 Seo et al.

FOREIGN PATENT DOCUMENTS

| | | |
|---|---|---|
| JP | 2014-216264 A | 11/2014 |
| JP | WO2019/167582 A1 | 9/2019 |
| KR | 10-2017-0024573 A | 3/2017 |
| KR | 10-2019-0046425 A | 5/2019 |
| KR | 10-2020-0059164 A | 5/2020 |
| KR | 10-2021-0018040 A | 2/2021 |
| KR | 10-2021-0097025 A | 8/2021 |
| KR | 10-2293034 B1 | 8/2021 |
| KR | 10-2021-0157890 A | 12/2021 |
| KR | 10-2022-0062974 A | 5/2022 |
| KR | 10-2023-0044448 A | 4/2023 |
| WO | 2021132762 A1 | 7/2021 |

OTHER PUBLICATIONS

Preliminary Examination Report for the Korean Patent Application No. 10-2022-0097383 issued by the Korean Intellectual Property Office on May 10, 2023.

Notice of Allowance for the Korean Patent Application No. 10-2022-0097383 issued by the Korean Intellectual Property Office on May 31, 2023.

Chekushkin Petr M. et al., The physical origin of the activation barrier in Li-ion intercalation processes: the overestimated role of desolvation, Electrochimica Acta, Jan. 29, 2021, p. 137843, vol. 372.

Extended European Search Report for the European Patent Application No. 23188000.6 issued by the European Patent Office on Dec. 19, 2023.

* cited by examiner

METHOD OF PREPARING CATHODE ACTIVE MATERIAL, CATHODE FOR LITHIUM SECONDARY BATTERY AND LITHIUM SECONDARY BATTERY

CROSS-REFERENCE TO RELATED APPLICATION AND CLAIM OF PRIORITY

This application claims priority to Korean Patent Application No. 10-2022-0097383 filed on Aug. 4, 2022 in the Korean Intellectual Property Office (KIPO), the entire disclosure of which is incorporated by reference herein.

BACKGROUND

1. Field of the Invention

The disclosures of the present patent document relates to a method of preparing cathode active material, a cathode for a lithium secondary battery and a lithium secondary battery.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a source of an eco-friendly vehicle.

Examples of the secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide is used as a cathode active material for the lithium secondary battery, and properties for providing high capacity, high power and extended life-span may be desirably required for the cathode active material. For example, a capacity may be enhanced by increasing a nickel content included in the lithium metal oxide.

However, the high-nickel lithium metal oxide may have low structural stability and thermal stability, and surface stability may be deteriorated at high temperature.

SUMMARY

According to an aspect of the present disclosure, there is provided a cathode for a lithium secondary battery having improved high temperature and power properties.

According to an aspect of the present disclosure, there is provided a method of preparing a cathode active material for a lithium secondary battery having improved high temperature and power properties.

According to an aspect of the present disclosure, there is provided a lithium secondary battery having improved high temperature and power properties.

A cathode for a lithium secondary battery includes a cathode current collector, and a cathode active material layer on the cathode current collector. The cathode active material layer includes a plurality of a lithium-metal oxide particle that has a shape of a single particle. An activation energy (Ea) in Equation 1 is in a range from 50 kJ/mol to 80 kJ/mol.

$$R' = R_0 \exp\left(\frac{-Ea}{RT}\right) \quad \text{[Equation 1]}$$

In Equation 1, R is a gas constant, T is an absolute temperature, R' represents a sum of all charge transfer resistances (Rct) from an analysis by an electrochemical impedance spectroscopy using a half-cell that includes the cathode and a lithium counter electrode as a Randles circuit, and $R_0$ is a constant representing a resistance having no temperature dependence among the charge transfer resistances.

In some embodiments, the lithium-metal oxide particle may have a single crystalline structure or a poly-crystalline structure in a crystallographic aspect.

In some embodiments, a crystallite size measured by an XRD analysis of the single particle may be 250 nm or more.

In some embodiments, the crystallite size measured by the XRD analysis of the single particle may be in a range from 250 nm to 1,000 nm.

In some embodiments, cation mixing ratio of the lithium-metal oxide particle may be 4% or less.

In some embodiments, the cation mixing ratio of the lithium-metal oxide particle may be in a range from 1% to 3%.

In some embodiments, the lithium-metal oxide particle may include nickel, and a mole fraction of nickel in the lithium-metal oxide particle may be 0.8 or more among elements other than lithium and oxygen.

In some embodiments, the lithium-metal oxide particle may include a doping or a coating including at least one of Al, Ti, Ba, Zr, Si, B, Mg, P, Sr, W and La.

A lithium secondary battery includes the cathode for a lithium secondary battery according to the above-described embodiments, and an anode facing the cathode.

In some embodiments, a percentage of a high-temperature resistance at 45° C. to a room-temperature resistance at 25° C. of the lithium secondary battery may be 40% or more.

In some embodiments, a percentage of a high-temperature resistance at 45° C. to a room-temperature resistance at 25° C. of the lithium secondary battery is in a range from 40% to 55%.

In a method of preparing a cathode active material for a lithium secondary battery, a mixture of metal hydroxide particles and a lithium source is prepared. A first firing of the mixture is performed at a temperature of 900° C. to 1,000° C. A second firing of the fired mixture is performed at a temperature of 600° C. to 850° C.

In some embodiments, the first firing and the second firing may be continuously performed.

In some embodiments, the first firing may be maintained for 1 hour to 5 hours.

In some embodiments, the second firing may be maintained for 10 hours to 15 hours.

In the cathode for a lithium secondary battery according to embodiments of the present disclosure, an activation energy (Ea) calculated from Equation 1 described later is in a range from 50 kJ/mol to 80 kJ/mol. Accordingly, resistance properties may be improved at room temperature and high temperature conditions, and sufficient power properties may be obtained even when a single particle-type active material is used.

The cathode may include a cathode active material in the form of a single particle, and may provide improved structural stability and thermal stability. Further, gas generation at high temperature may be suppressed, and thus improved high-temperature reliability may be provided.

In example embodiments, the cathode active material in the form of the single particle having a controlled activation energy value may be provided by adjusting a firing temperature.

DETAILED DESCRIPTION OF THE EMBODIMENTS

According to embodiments of the present disclosure, a cathode for a lithium secondary battery having a controlled activation energy defined by Equation 1 as described later.

Further, methods of preparing the cathode and a cathode active material for the cathode, and a lithium secondary battery including the cathode are provided.

Hereinafter, embodiments of the present disclosure will be described in detail with reference to embodiments and examples, and the accompanying drawings. However, those skilled in the art will appreciate that such embodiments and drawings are provided to further understand the spirit of the present invention and do not limit subject matters to be protected as disclosed in the detailed description and appended claims.

Figure 1:
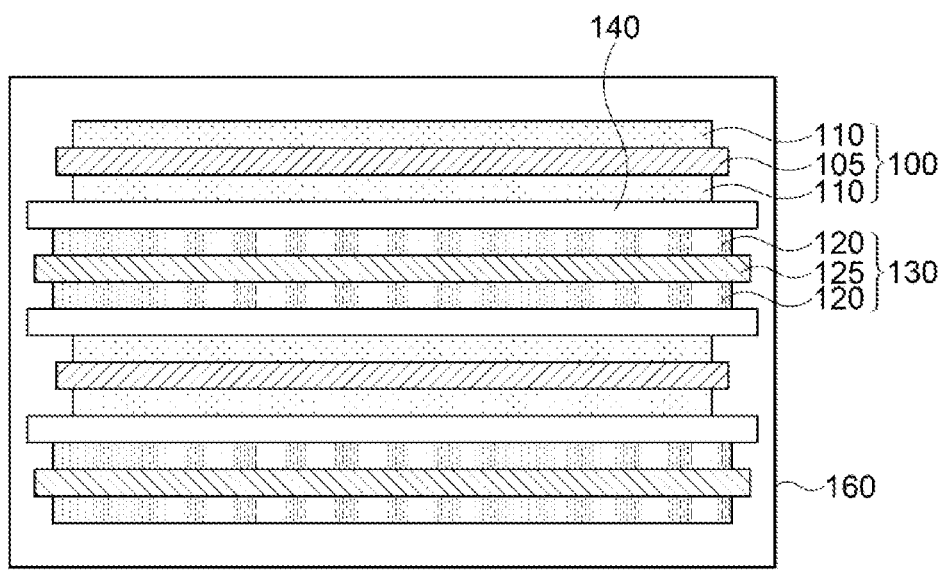
FIGS. 1 and 2 are a schematic cross-sectional view and a schematic plan view, respectively, illustrating a lithium secondary battery in accordance with example embodiments.
Figure 2:
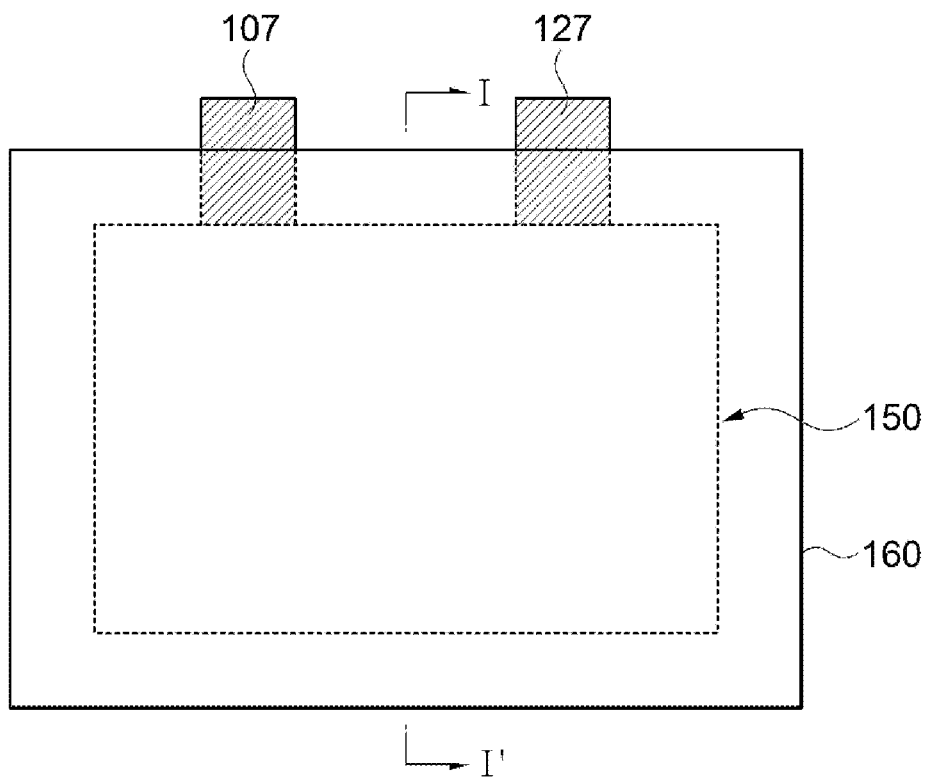

FIGS. 1 and 2 are a schematic cross-sectional view and a schematic plan view, respectively, illustrating a lithium secondary battery in accordance with example embodiments. For example, FIG. 1 is a cross-sectional view taken along a line I-I' of FIG. 2.

Referring to FIG. 1, a lithium secondary battery may include a cathode 100 and an anode 130 facing the cathode 100.

The cathode 100 may include a cathode current collector 105 and a cathode active material layer 110 formed by coating a cathode active material on the cathode current collector 105.

In an embodiment, the cathode active material layer 110 may include lithium-metal oxide particles having a shape of a single particle, and the lithium-metal oxide particles may contain lithium and other metal elements such as transition metals.

The single particle can be morphologically distinguished from a secondary particle. For example, the single particle and the secondary particle may be distinguished based on a cross-sectional image of the particle measured by a scanning electron microscope (SEM).

For example, the secondary particle may refer to a particle that is substantially considered or observed as one particle formed by aggregation of a plurality of primary particles. For example, boundaries of the primary particles may be observed in an SEM cross-sectional image of the secondary particle.

For example, the secondary particle may be an aggregate of more than 10, 30 or more, 50 or more, or 100 or more of primary particles.

For example, the single particle may be a monolith rather than an aggregate. For example, the boundaries of the primary particles may not be observed within the single particle in an SEM cross-sectional image.

In an embodiment, fine particles (e.g., particles having a volume of $1/100$ or less of a volume of the single particle) may be attached to a surface of the single particle, and the structure may not be excluded from the concept of the single particle.

For example, the single particles may be present in contact with each other. For example, 2 to 10, 2 to 5, or 2 to 3 single particles may be present in contact with each other.

In example embodiments, the cathode active material may include the lithium-metal oxide particles in the form of the single particle. In this case, particle cracks may be reduced even at a high electrode density, and an interfacial contact with an electrolyte may be reduced to prevent life-span deterioration. Thus, life-span properties of the secondary battery and a capacity retention during repeated charging and discharging may be improved.

In some embodiments, the single particle may have a crystallite size measured by an XRD analysis of 250 nm or more. In an embodiment, the crystallite size of the single particle may be in a range from 250 nm to 1,000 nm, from 250 nm to 500 nm, or from 250 nm to 400 nm. Within the above range, crack stability of the lithium-metal oxide particles may be increased and resistance increase within the particles may be prevented.

The "crystallite size" can be measured through the X-ray diffraction (XRD) analysis. The crystallite size may be calculated by a Scherrer equation represented as Equation 2 using a full width at half maximum (FWHM) obtained through the XRD analysis.

$$L = \frac{0.9\lambda}{\beta \cos\theta} \quad \text{[Equation 2]}$$

In Equation 2, L represents a crystallite size, $\lambda$, represents an X-ray wavelength, $\beta$ represents a full width at half maximum (FWHM) of a peak, and $\theta$ represents a diffraction angle. In example embodiments, the FWHM in the XRD analysis for measuring the crystallite size may be measured from a peak of (003) plane.

In some embodiments, the XRD analysis is performed using a Cu K$\alpha$ ray as a diffraction light source for a dried powder of the lithium-metal oxide particles in a diffraction angle (2$\theta$) range of 10° to 120°, at a scan rate of 0.0065°/s.

In some embodiments, in Equation 2 above, $\beta$ may represent a FWHM obtained by correcting a value derived from an equipment. In an embodiment, Si may be used as a standard material for reflecting the equipment-derived value. In this case, the device-derived FWHM may be expressed as a function of 2$\theta$ by fitting a FWHM profile in an entire 2$\theta$ range of Si. Thereafter, a value obtained by subtracting and correcting the equipment-derived FWHM value at the corresponding 2$\theta$ from the function may be used as $\beta$.

In some embodiments, the lithium-metal oxide particle may have the single particle form having a single crystalline structure or a polycrystalline structure in a crystallographic aspect.

For example, if the single particle has the single crystalline structure, the single particle may substantially consist of one single crystal. If the single particle has the polycrystalline structure, the single particle may include two or more single crystals.

For example, the single crystalline structure and the polycrystalline structure may be distinguished based on an ion image obtained by analyzing a cross-section of a particle with a focused ion beam (FIB). For example, if a particle has the polycrystalline structure, two or more single crystals may be observed in the FIB analysis image according to a difference of a crystal orientation. For example, even though a particle is observed as a single particle in an SEM cross-sectional image, the particle may be observed as including two or more crystals in the FIB analysis image.

In some embodiments, the lithium-metal oxide particle may have a layered structure. For example, the single particles of a lithium nickel-based metal oxide may be assembled to form the layered structure to form the lithium-metal oxide particles as a cathode active material. Mobility of lithium ions generated from the cathode active material may be further improved by the above-described particle structure.

According to embodiments of the present disclosure, an activation energy (Ea) of the cathode calculated from Equation 1 may be in a range from 50 kJ/mol to 80 kJ/mol. In an embodiment, the activation energy of the cathode may be in a range from 60 kJ/mol to 80 kJ/mol.

$$R' = R_0 \exp\left(\frac{-Ea}{RT}\right) \qquad \text{[Equation 1]}$$

In Equation 1, R is a gas constant and T is an absolute temperature. R' is a sum of charge transfer resistances (Rct) from an analysis result by an electrochemical impedance spectroscopy using a half-cell that includes the cathode, a lithium counter electrode (e.g., a lithium metal electrode), a separator and an electrolyte as a Randles circuit. $R_0$ is a constant representing a resistance having no temperature dependence among the charge transfer resistances.

The electrochemical impedance spectroscopy is a method of modeling and analyzing an electrochemical reaction occurring at an electrode as an equivalent electric circuit, e.g., the Randles circuit. The term "Randles circuit" used herein may refer to an equivalent circuit modeling of an electrochemical reaction occurring in an electrode and an electrolyte.

Figure 3:
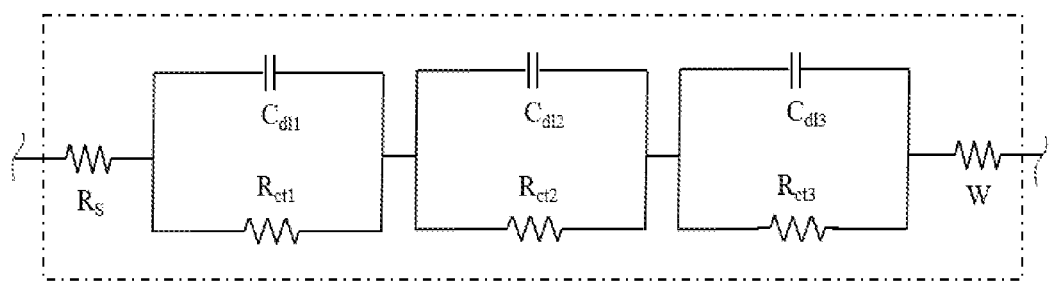
FIG. 3 is a circuit diagram illustrating a Randles circuit in accordance with example embodiments.

FIG. 3 is a circuit diagram illustrating the Randles circuit in accordance with example embodiments. The charge transfer resistance (Rct) is related to a redox reaction that occurs on an electrode surface, the cathode active material layer, a coating layer of the cathode active material and a junction between primary particles in a secondary particle, etc., and may reflect an effect of a reaction rate on a resistance of each step.

An electrolyte resistance Rs may be an impedance representing a resistance of an electrolyte solution. The electrolyte resistance Rs may include all electrical resistance from an electrochemical impedance spectroscopy equipment to the electrode active material layer of the half-cell.

An electric double layer capacitance (Cdl) may be an impedance reflecting a charge distribution similar to that of a capacitor formed by gathered charges having opposite polarities in an electric double layer at an interface between the electrode and the electrolyte solution. A Warburg impedance (W) is related to a continuous change of a material composition of the electrode surface and a material distribution of a bulk electrolyte solution along a diffusion layer in the electrochemical reaction, and may be an impedance representing movement and diffusion of electrochemically active materials (lithium ions, etc.).

For example, each impedance may be measured by considering the half-cell as the Randall circuit formed of the electrolyte resistance, the charge transfer resistance, the Warburg impedance and the electrical double layer capacitance.

Figure 4:
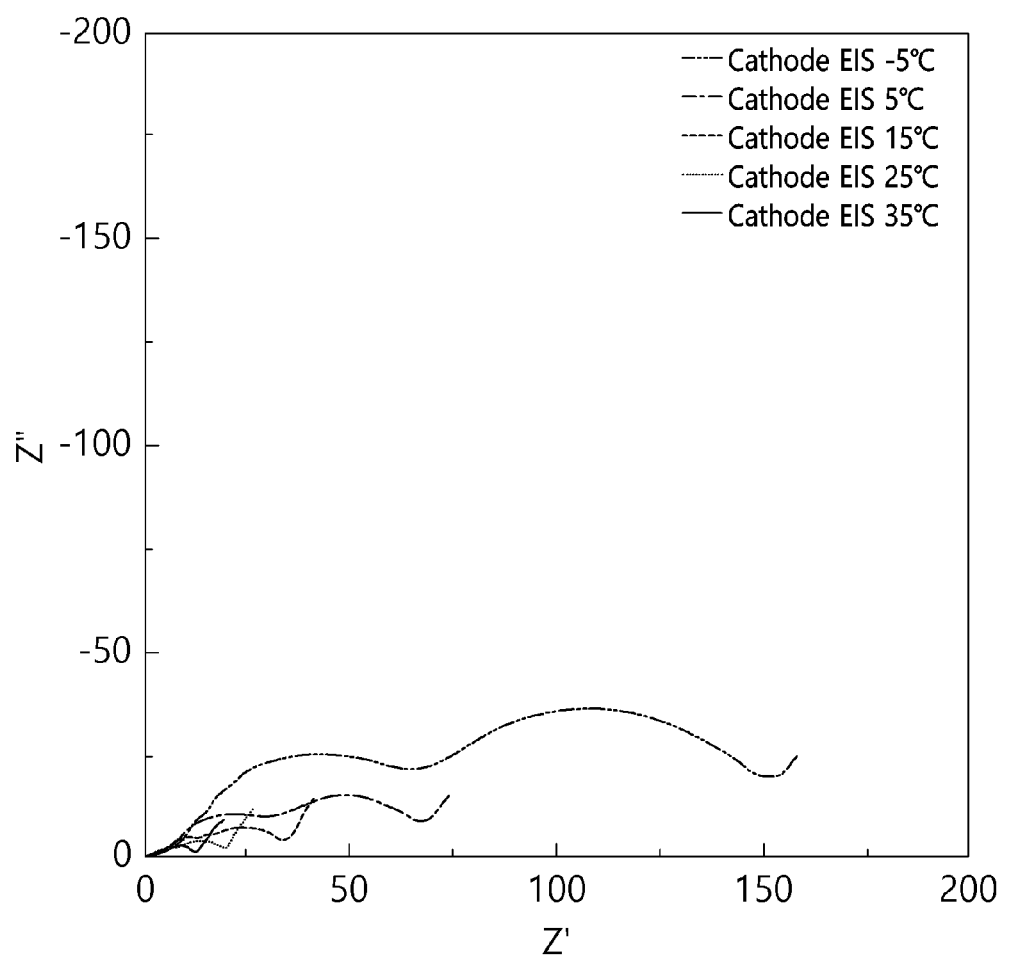
FIG. 4 is an exemplary graph showing results measured according to an electrochemical impedance spectroscopy.

FIG. 4 is an exemplary graph showing results measured according to an electrochemical impedance spectroscopy.

As illustrated in FIG. 4, an impedance value of a battery or a half-cell may be measured for each temperature. An activation energy value can be analyzed by fitting the measured result to an Arrhenius plot of Equation 1.

In an embodiment, Equation 1 indicates an Arrhenius equation, and may represent a temperature dependence of the electrode resistance.

R' is the sum of all charge transfer resistances (Rct) in the results analyzed by electrochemical impedance spectroscopy, and may be related to the redox reaction occurring on the electrode surface, and may be an impedance that indicates the effect of the reaction rate on resistance. $R_0$ is a resistance constant having no temperature dependence in the charge transfer resistance (Rct). R is a gas constant (J/mol K), and T is an absolute temperature (K).

According to embodiments of the present disclosure, the activation energy (Ea) of the cathode calculated from Equation 1 is in a range from 50 kJ/mol. to 80 kJ/mol. Within the above range, the temperature dependence of the electrode resistance may be increased, and the resistance of the electrode may be reduced at a temperature above a normal temperature at which the cell operates.

The Activation energy (Ea) is obtained from a slope of a straight line obtained through the Arrhenius plotting of Equation 1, and $R_0$ can be obtained from a y-intercept of the straight line.

The activation energy of the cathode may be a value obtained by connecting a cathode separated from a battery with a lithium metal anode to form a half-cell, and then conducting the above-described method by the EIS analysis.

When using the single particle as the cathode active material, the resistance may increase. According to embodiments of the present disclosure, a resistance at high temperature may be reduced by increasing the activation energy of the cathode to increase the temperature dependence of the resistance. Accordingly, power properties of the secondary battery can be improved. Additionally, an amount of gas generated at high temperature may be reduced and high-temperature life-span properties may be improved.

As used herein, the term "cation mixing" refers to a phenomenon that a size of $Ni^{2+}$ ion (0.69 Å) and a size of $Li^+$ ion (0.76 Å) are similar in the layered crystalline structure of the lithium-metal oxide, and positions of the two ions are partially exchanged. For example, during high-temperature firing of the cathode active material, some Ni atoms of a transition metal layer are inserted into a Li atomic layer to exchange positions with each other to form crystals.

The term "cation mixing ratio" used herein may refer to a ratio occupied by the Ni atoms based on a total amount of lithium sites in the Li atomic layer.

In example embodiments, the cation mixing ratio of the lithium-metal oxide particles may be 4% or less. In some embodiments, the cation mixing ratio of the lithium-metal oxide particles may be in a range from 1% to 3%.

Generally, as a nickel content increases, the cation mixing may be easily caused, which may hinder release and insertion of the Li ions during charging and discharging of the battery. As a result, capacity and efficiency of the secondary battery may be degraded.

According to embodiments of the present disclosure, the cation mixing ratio may be adjusted within the above range while controlling the activation energy of the cathode as described above. Thus, the battery having power properties comparable to those of a secondary battery using the secondary particles may be implemented while using the cathode active material having the single-particle structure.

In some embodiments, the cation mixing ratio may be measured by an X-ray diffraction (XRD) and a Rietveld refinement, and may be obtained from accurate crystallographic analysis results.

For example, the Rietveld refinement method can analyze an entire diffraction pattern at once without separating peaks of X-ray diffraction patterns measured according to the XRD for a lithium metal oxide. Accordingly, the analysis by the Rietveld refinement method can provide more accurate crystallographic analysis results. For example, differences in chemical properties resulting from the composition and crystal structure of the lithium metal oxide can be more accurately measured and identified.

For example, the Rietveld refinement method may be performed using a High score plus program and a pseudo-Voight function model. However, the program used in the Rietveld refinement method is not particularly limited.

In example embodiments, the lithium-metal oxide particle may have a chemical structure or layered structure represented by Chemical Formula 1 below.

$$Li_xNi_{1-y}M_yO_{2+z}$$ [Chemical Formula 1]

In Chemical Formula 1, 0.9≤x≤1.2, 0≤y≤0.7, and −0.1≤z≤0.1. M may include at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

For example, the lithium-metal oxide particle may include nickel (Ni) and may further include at least one of cobalt (Co) and manganese (Mn).

Ni may serve as a transition metal related to output and capacity of the lithium secondary battery. Thus, as described above, a High-Ni composition may be employed to the lithium-metal oxide particle, so that a high-power cathode and a high-power lithium secondary battery may be provided. However, as the Ni content increases, long-term storage stability and life-span stability of the cathode or secondary battery may be relatively deteriorated.

Accordingly, according to example embodiments, the life-span stability and capacity retention may be improved using Mn while maintaining an electrical conductivity by the inclusion of Co.

Manganese (Mn) may serve as a metal related to mechanical and electrical stability of the lithium secondary battery. For example, manganese may suppress or reduce the defects such as ignition and short circuit caused when the cathode is penetrated by an external object, and may enhance the life-span of the lithium secondary battery. Further, cobalt (Co) may serve as a metal associated with a conductivity or a resistance of the lithium secondary battery.

In example embodiments, the lithium-metal oxide particle may include nickel. Nickel may be included in an excess amount among elements other than lithium and oxygen of the lithium-metal oxide particle.

The term "excess amount" as used herein may refer to the largest mole fraction or content.

In example embodiments, nickel may be included in an excessive amount among elements other than lithium and oxygen to significantly improve the capacity of the secondary battery.

In example embodiments, the mole fraction of nickel among elements other than lithium and oxygen of the lithium-metal oxide particle may be 0.8 or more.

In some preferable embodiments, a molar ratio or a concentration (1−y) of Ni in Chemical Formula 1 may be greater than or equal to 0.8, more preferably greater than 0.8, and in some embodiments less than or equal to 0.98.

In example embodiments, the lithium-metal oxide particle may include a doping or a coating including at least one of Al, Ti, Ba, Zr, Si, B, Mg, P, Sr, W and La.

In the lithium metal oxide particle, a content of the doping element may be in a range from about 0.1 mol % to 1 mol % based on a total number of moles of Ni, Co, Mn and the doping element (e.g., Al, Zr and/or Ti). In an embodiment, the content of the doping element may be in a range from about 0.5 mol % to 1 mol %. Within the above range, the chemical and structural stability of the lithium-transition metal oxide particle may be further improved without causing an excessive activity deterioration.

The coating may be derived from a coating metal oxide such as $Al_2O_3$, $ZrO_2$ and/or $TiO_2$. An added amount of the coating metal oxide for forming the coating may be in a range from about 0.5 wt % to 1 wt % based on the total weight of the lithium-metal oxide particle.

A secondary battery according to example embodiments includes a cathode including the cathode active material as described above; and an anode disposed to face the cathode.

In example embodiments, a percentage of a high temperature (45° C.) resistance value relative to a room temperature (25° C.) resistance value of the lithium secondary battery may be 40% or more, and in an embodiment, from 40% to 55%, or from 42% to 54%. As the activation energy of the cathode increases, the temperature dependence of the electrode resistance increases, and resistance properties may be further improved at high temperature. Additionally, in consideration of high-temperature stability (storage, life-span properties, etc.), resistance properties and high-temperature stability may both be improved within the above range.

Hereinafter, a method for preparing a cathode active material according to the above-described embodiments of the present disclosure is provided.

In example embodiments, a metal precursor solution may be prepared. The metal precursor solution may include precursors of metals to be included in the cathode active material. For example, a lithium precursor and a transition metal precursor may be included.

The transition metal precursor may include a compound containing nickel, cobalt and manganese. For example, the transition metal precursor may include a nickel salt, a manganese salt and a cobalt salt. Examples of the nickel salt include nickel sulfate, nickel hydroxide, nickel nitrate, nickel acetate and a hydrate thereof. Examples of the manganese salt include manganese sulfate, manganese acetate and a hydrate thereof. Examples of the cobalt salt include cobalt sulfate, cobalt nitrate, cobalt carbonate and a hydrate thereof.

An aqueous solution may be prepared by mixing the metal salts of the active material with a precipitating agent and/or a chelating agent in a ratio satisfying the content or concentration ratio of each metal described with reference to Chemical Formula 1 above. For example, a co-precipitating of the aqueous solution may be performed in a reactor, and a transition metal precursor (e.g., an NCM precursor) in the form of a hydroxide may be prepared.

The precipitating agent may include an alkaline compound such as sodium hydroxide (NaOH) or sodium carbonate ($Na_2CO_3$). The chelating agent may include, e.g., ammonia water (e.g., $NH_4OH$), ammonium carbonate, etc.

Thereafter, the lithium precursor may be mixed with the transition metal precursor and reacted through a co-precipitation method to prepare a lithium-transition metal composite. The lithium precursor may include, e.g., lithium carbonate, lithium nitrate, lithium acetate, lithium oxide, lithium hydroxide, etc. These may be used alone or in a combination thereof.

The lithium-metal composite may be calcined or fired to form a lithium-metal oxide having a shape of a single particle. The firing may include a first firing and a second firing performed at a lower temperature than that of the first firing.

In an embodiment, the first firing and the second firing may be continuously performed. In an embodiment, the second firing may be performed after the first firing. In an embodiment, the first firing may be performed after the second firing.

In example embodiments, the first firing may be performed at a temperature of 900° C. to 1,000° C. in an oxygen-containing atmosphere, and may be maintained for 1 hour to 5 hours. The second firing may be performed at a temperature of 600° C. to 850° C. in an oxygen-containing atmosphere, and may be maintained for 10 to 15 hours.

A slurry may be prepared by mixing and stirring the above-mentioned cathode active material or the lithium-metal oxide particles with a binder, a conductive material and/or a dispersive material in a solvent. The slurry may be coated on a cathode current collector 105, and dried and pressed to form the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In example embodiments, the anode 130 may include an anode current collector 125 and an anode active material layer 120 formed by coating an anode active material on the anode current collector 125. In example embodiments, the anode active material layer 120 may be formed on both surfaces (e.g., upper and lower surfaces) of the anode current collector 125. The anode active material layer 120 may be coated on each of the upper and lower surfaces of the anode current collector 125. For example, the anode active material layer 120 may directly contact the surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon or tin, etc.

The amorphous carbon may include hard carbon, cokes, a mesocarbon microbead (MCMB), a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include gold, stainless steel, nickel, aluminum, titanium, copper or an alloy thereof, and may include, e.g., copper or a copper alloy.

In some embodiments, an anode slurry may be prepared by mixing and stirring the anode active material with a binder, a conductive material and/or the dispersive agent in a solvent. The slurry may be coated on the anode current collector 125, and then dried and pressed to form the anode 130.

Materials substantially the same as or similar to those used for forming the cathode 100 may be used as the binder and the conductive material for the anode 130. In some embodiments, the binder for forming the anode 130 may include, e.g., styrene-butadiene rubber (SBR) or an acrylic binder for compatibility with the graphite-based active material, and a thickener such as carboxymethyl cellulose (CMC) may also be used.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, etc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation. Thus, the effects of improving both power and stability from the above-described cathode active material may be more easily implemented.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, stacking or folding of the separation layer 140.

The electrode assembly 150 may be accommodated together with an electrolyte in an outer case 160 to define the lithium secondary battery. In example embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

Electrode tabs may be formed from the cathode current collector 105 and the anode current collector 125 included in each electrode cell to extend to one side of the outer case 160. The electrode tabs may be welded together with the one side of the outer case 160 to be connected to an electrode lead that may be extended or exposed to an outside of the outer case 160.

The lithium secondary battery may be manufactured in, e.g., a cylindrical shape using a can, a square shape, a pouch shape, a coin shape, etc.

Hereinafter, preferred embodiments are proposed to more concretely describe the present disclosure. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Preparation of Lithium-Metal Oxide Particles $NiSO_4$, $CoSO_4$ and $MnSO_4$ were mixed in a molar ratio of 0.8:0.1:0.1, respectively, using distilled water from which internal dissolved oxygen was removed by bubbling with $N_2$ for 24 hours. The mixed solution was added to a reactor at 50° C., and NaOH and $NH_3H_2O$ were added as a precipitating agent and a chelating agent. Thereafter, a co-precipitation reaction was performed for 72 hours to obtain $Ni_{0.8}Co_{0.1}Mn_{0.1}(OH)_2$ as a transition metal precursor. The obtained transition metal precursor was dried at 100° C. for 12 hours, and then redried at 120° C. for 10 hours.

Lithium hydroxide and the transition metal precursor were added to a dry high-speed mixer at a molar ratio of 1.03:1 and mixed uniformly for 20 minutes. The mixture was put into a firing furnace and heated up to 950° C. at a ramping rate of 2° C./min, maintained for 4 hours, and then cooled to 800° C. and maintained for 12 hours.

Oxygen was continuously supplied at a flow rate of 10 mL/min during the temperature elevation and maintenance. After the firing, natural cooling was performed to room temperature, followed by pulverization and classification to prepare cathode active material particles, which were lithium-metal oxide particles having the single particle form and having a composition of $LiNi_{0.8}Co_{0.1}Mn_{0.1}O_2$.

(2) Fabrication of Half-Cell

A cathode slurry was prepared by mixing the cathode active material particles of (1), Denka Black as a conductive material and PVDF as a binder in a mass ratio of 94:3:3, respectively. The slurry was coated on an aluminum current collector, and then dried and pressed to form a cathode. An electrode density of the prepared cathode was 3.0 g/cc or more and a loading amount was adjusted within a range from 8 mg/cm 2 to 15 mg/cm 2.

A lithium metal foil was used as a counter electrode (an anode).

A 1M $LiPF_6$ solution in a mixed solvent of EC/EMC/DEC (volume ratio: 25/45/30) was used as an electrolyte.

After punching and stacking the cathode and anode in Φ14 and Φ16 sizes, respectively, a separator (polyethylene, thickness 25 μm) was inserted between the cathode and the anode to form an electrode cell. The electrolyte was injected, and impregnation was performed for more than 12 hours to prepare a 2016 type of a coin-half cell.

The coin-half cell prepared as described above was subjected to a formation charging and discharging twice (charging condition: CC-CV 0.1C 4.3V 0.005C CUT-OFF, discharging condition: CC 0.1C 2.5V CUT-OFF).

(3) Fabrication of Lithium Secondary Battery

A cathode mixture was prepared by mixing the cathode active material particles prepared in the above (1), Denka Black as a conductive material, and PVDF as a binder in a mass ratio of 98:1:1, respectively. The cathode mixture was coated on an aluminum current collector, dried and pressed to prepare a cathode. An electrode density of the cathode was adjusted to 3.5 g/cc or more after the pressing 93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then adding 1 wt % of vinylene carbonate, 0.5 wt % of 1,3-propensultone (PRS) and 0.5 wt % of lithium bis(oxalato)borate (LiBOB).

Example 2

The same processes as those in Example 1 was performed except that the firing temperature were raised to 950° C. and maintained for 5 hours, and maintained at 800° C. for 15 hours when preparing the lithium-metal oxide particles in the above (1).

Example 3

The same processes as those in Example 1 was performed except that the firing temperature were raised to 950° C. and maintained for 3 hours, and maintained at 800° C. for 10 hours when preparing the lithium-metal oxide particles in the above (1).

Comparative Example 1

The same processes as those in Example 1 was performed except that the firing temperature were raised to 750° C. and maintained for 15 hours when preparing the lithium-metal oxide particles in the above (1).

Comparative Example 2

The same processes as those in Example 1 was performed except that the firing temperature were raised to 850° C. and maintained for 10 hours when preparing the lithium-metal oxide particles in the above (1).

Experimental Example 1: Crystallite Size ($S_{XRD}$) Analysis

Lithium metal oxide particles of Examples and Comparative Examples were sampled. The sampled lithium metal oxide particles were analyzed by an XRD (X-ray diffraction) to measure crystallite sizes ($S_{XRD}$).
An XRD analysis equipment and conditions are shown in Table 1 below, and the results are shown in Table 2.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

Experimental Example 2: Measurement of Activation Energy

After charging the half-cell prepared according to the above (2) in the Examples and Comparative Examples to a state of SOC 100%, a temperature was adjusted in a range of 298K to 378K in a chamber and resistance values (R', $R_0$) for each temperature were measured. Specifically, the resistance values were measured using an electron impedance spectroscopy (EIS). The EIS analysis was performed under conditions of an amplitude of 10 mV and a frequency of 0.1 Hz to $10^6$ Hz.
The measured resistance values was converted into an Arrhenius plot of Equation 1, and an activation energy (Ea) was calculated from a slope value.

Experimental Example 3: Measurement of Cation Mixing Ratio

Cation mixing values of the lithium metal oxide particles of Examples and Comparative Examples were measured through an XRD analysis. Specifically, the XRD analysis was performed under the conditions of Table 1, and the conditions of Rietveld refinement are as follows.
1) Rietveld Refinement Conditions
  Program: High score plus
  Model: pseudo-Voigt function
The measurement results are shown in Table 2 below.

TABLE 2

| | lithium metal oxide particles | $S_{XRD}$ (nm) | Ea (kJ/mol) | cation mixing ratio (%) |
|---|---|---|---|---|
| Example 1 | single particle | 350 | 62.7 | 2.98 |
| Example 2 | single particle | 300 | 50.0 | 2.51 |
| Example 3 | single particle | 255 | 79.0 | 2.45 |
| Comparative Example 1 | secondary particle | 130 | 43.2 | 1.85 |
| Comparative Example 2 | single particle | 256 | 49.5 | 2.01 |

Experimental Example 4: Evaluation on Resistance Properties (1) Room Temperature Resistance
The lithium secondary battery prepared according to the above (3) in Examples and Comparative Examples was charged at 925 mAh at 25° C. under CC/CV (0.5C-0.05C) conditions to SOC50, and then a DCR was measured. Specifically, the cell set to SOC50 was discharged with a 1C current, and a voltage before the discharge (V0) and a voltage (V1) during discharge after 10 seconds were measured to calculate the DCR according to the following equation.

DCR=(V1−V0)/1C current (Ampere)

(2) High-Temperature Resistance Properties
The above DCR measurement was performed at 45° C. The measurement results are shown in Table 3. Further, a percentage (%) of the high-temperature resistance value to the room-temperature resistance value is also shown in Table 3.

TABLE 3

| | resistance property (mΩ) | | |
|---|---|---|---|
| | room temperature resistance | high temperature resistance | high temperature resistance/ room temperature resistance (%) |
| Example 1 | 4.90 | 2.51 | 51.22 |
| Example 2 | 5.11 | 2.73 | 53.42 |
| Example 3 | 4.92 | 2.07 | 42.10 |
| Comparative Example 1 | 4.42 | 2.62 | 59.27 |
| Comparative Example 2 | 4.48 | 2.44 | 54.38 |

Experimental Example 5: High-Temperature Properties (1) Gas Generation after High-Temperature Storage (60° C.)
The lithium secondary battery prepared according to the above (3) in Examples and Comparative Examples was charged (1C 4.2V 0.1C CUT-OFF), stored in a constant temperature chamber at 60° C. for 16 weeks, and then an amount of gas generation was measured using a gas-chromatography (GC) analysis. The results are shown in Table 4.

TABLE 4

| | high temperature storage property (60° C.) gas generation (mL) | | | |
|---|---|---|---|---|
| | 4 weeks | 8 weeks | 12 weeks | 16 weeks |
| Example 1 | 18 | 23 | 33 | 38 |
| Example 2 | 18 | 34 | 42 | 51 |
| Example 3 | 20 | 22 | 28 | 29 |
| Comparative Example 1 | 25 | 54 | 56 | 63 |

TABLE 4-continued

| | high temperature storage property (60° C.) gas generation (mL) | | | |
|---|---|---|---|---|
| | 4 weeks | 8 weeks | 12 weeks | 16 weeks |
| Comparative Example 2 | 23 | 28 | 33 | 40 |

(2) High-Temperature Life-Span Capacity Retention (45° C.)

Charging (CC-CV 1C 4.2V 0.05C CUT-OFF) and discharging (CC 1C 2.7V CUT-OFF) were repeated 300 times in a chamber of 45° C. for the lithium secondary battery prepared according to the above (3) in Examples and Comparative Examples. Thereafter, gas generations at the 100th cycle, the 200th cycle and the 300th cycle were measured through an GC analysis (CC: Constant Current, CV: Constant Voltage). To measure a total amount of gas generation, a hole was formed in a vacuum chamber of a predetermined volume (V), and a volume of gas generation was calculated by measuring a pressure change.

A capacity retention of each lithium secondary battery was calculated as a ratio (%) of a discharge capacity at the 300th cycle to a discharge capacity at the 1st cycle.

The results are listed in Table 5.

TABLE 5

| | gas generation (mL) | | | capacity retention (%) |
|---|---|---|---|---|
| | 100 | 200 | 300 | (45° C., 300 cyc) |
| Example 1 | 23 | 46 | 52 | 92 |
| Example 2 | 20 | 52 | 61 | 90 |
| Example 3 | 20 | 43 | 48 | 87 |
| Comparative Example 1 | 24 | 65 | 88 | 79 |
| Comparative Example 2 | 26 | 55 | 63 | 83 |

Referring to Table 3, improved resistance properties (the room temperature resistance and the high temperature resistance) were provided in the secondary batteries of Examples. The room temperature resistance was provided at a level similar to that of Comparative Example 1 in which secondary particles were used, and the high temperature resistance was reduced compared to that from Comparative Example 1.

Referring to Tables 4 and 5, even when the single particles were used, in Comparative Example 2 where Ea was less than 50 kJ/mol, the high temperature resistance was reduced, but the high temperature storage and life-span properties were degraded compared to those from Examples. Specifically, the gas generation at high temperature was reduced compared to that from Comparative Example 1, but the gas generation was increased compared to those from Examples, and the storage and life-span properties and the capacity retention were deteriorated.

However, the high temperature resistance, storage and life-span properties and the capacity retention of the secondary batteries were generally enhanced in Examples.

What is claimed is:

1. A cathode for a lithium secondary battery, comprising:
    a cathode current collector; and
    a cathode active material layer on the cathode current collector, the cathode active material layer comprising a plurality of lithium-metal oxide particles that have a shape of a single particle,
    wherein each of the plurality of lithium-metal oxide particles has a chemical structure represented by Chemical Formula I $$Li_xNi_{1-y}M_yO_{2+z}$$ [Chemical Formula 1]

where $0.9 \leq x \leq 1.2$, $0 \leq y \leq 0.7$, and $-0.1 \leq z \leq 0.1$, M may include at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr,
    wherein an activation energy (Ea) of the cathode in Equation 1 is in a range from 50 kJ/mol to 80 KJ/mol:

$$R'=R_0 \exp(-Ea/RT)$$ [Equation 1]

wherein, in Equation 1, R is a gas constant, T is an absolute temperature, R' represents a sum of all charge transfer resistances (Rct) from an analysis by an electrochemical impedance spectroscopy using a half-cell that includes the cathode and a lithium counter electrode as a Randles circuit, and $R_0$ is a constant representing a resistance having no temperature dependence among the charge transfer resistances,
    wherein a cation mixing ratio of the plurality of lithium-metal oxide particles is 1% to 4%, and
    wherein the lithium-metal oxide particles include a lithium-metal oxide particle having poly-crystalline structure in a crystallographic aspect.

2. The cathode for a lithium secondary battery according to claim 1, wherein the crystallite size measured by the XRD analysis of the single particle is in a range from 250 nm to 1,000 nm.

3. The cathode for a lithium secondary battery according to claim 1, wherein the cation mixing ratio of the plurality of lithium-metal oxide particles is in a range from 1% to 3%.

4. The cathode for a lithium secondary battery according to claim 1, wherein $0 \leq y \leq 0.2$.

5. The cathode for a lithium secondary battery according to claim 1, wherein the plurality of lithium-metal oxide particles includes a doping element selected from the group consisting of Al, Ti, Ba, Zr, Si, B, Mg, P, Sr, W, La, and combinations thereof.

6. A lithium secondary battery, comprising:
    the cathode for a lithium secondary battery according to claim 1; and
    an anode facing the cathode.

7. The lithium secondary battery according to claim 6, wherein a percentage of a high-temperature resistance at 45° C. to a room-temperature resistance at 25° C. of the lithium secondary battery is in a range from 40% to 55%.

* * * * *